(12) United States Patent
Werner et al.

(10) Patent No.: US 8,953,287 B2
(45) Date of Patent: Feb. 10, 2015

(54) MOBILE GENERATOR AND MOBILE GENERATOR PROTECTIVE DEVICE

(75) Inventors: Michael Werner, Heuchlingen (DE); Michael Kurz, Spraitbach (DE)

(73) Assignee: KW-Generator GmbH & Co. KG, Schwäbisch Gmünd (DE)

( * ) Notice: Subject to any disclaimer, the term of this patent is extended or adjusted under 35 U.S.C. 154(b) by 258 days.

(21) Appl. No.: 13/566,533

(22) Filed: Aug. 3, 2012

(65) Prior Publication Data

US 2013/0033787 A1 Feb. 7, 2013

(30) Foreign Application Priority Data

Aug. 4, 2011 (DE) .......................... 10 2011 080 436

(51) Int. Cl.
| | |
|---|---|
| H02H 7/06 | (2006.01) |
| H02H 3/00 | (2006.01) |
| H02H 3/04 | (2006.01) |
| H02H 3/20 | (2006.01) |
| H02H 3/44 | (2006.01) |

(52) U.S. Cl.
CPC ................. H02H 3/04 (2013.01); H02H 3/205 (2013.01); H02H 3/445 (2013.01)
USPC .................................... 361/21; 361/1; 361/20

(58) Field of Classification Search
CPC .......... H02H 7/06; H02H 7/062; H02H 7/065
USPC .................................................. 361/1, 20, 21
See application file for complete search history.

(56) References Cited

U.S. PATENT DOCUMENTS

| | | | |
|---|---|---|---|
| 4,605,981 A | 8/1986 | Huvet et al. | |
| 7,245,471 B2 * | 7/2007 | Pollock et al. | ............... 361/91.5 |
| 2004/0169016 A1 * | 9/2004 | Adachi et al. | ............. 219/69.15 |
| 2005/0036846 A1 * | 2/2005 | Kato | ............................ 409/230 |
| 2005/0094345 A1 | 5/2005 | Pollock et al. | |
| 2007/0036625 A1 * | 2/2007 | Kato | ............................ 409/230 |
| 2009/0160590 A1 | 6/2009 | Maraval et al. | |

FOREIGN PATENT DOCUMENTS

| | | |
|---|---|---|
| DE | 28 51 537 A1 | 6/1980 |
| DE | 44 27 032 C1 | 3/1995 |
| DE | 10 2007 015 933 A1 | 7/2008 |
| DE | 10 2008 025 501 A1 | 12/2009 |

* cited by examiner

*Primary Examiner* — Eduardo Colon Santana
*Assistant Examiner* — Gabriel Agared
(74) *Attorney, Agent, or Firm* — McGlew and Tuttle, P.C.

(57) ABSTRACT

A mobile generator for generating a direct voltage for a tool supplied with direct current includes an alternating-voltage generator (1), an electronic control unit (3), a rectifier unit (2), which has a direct-voltage output (6) with live conductors (9, 10) for connecting the tool (11), and a protective device (14). The protective device is between the live conductors (9, 10) and a protective potential (18), especially ground or a protective wire. The protective device (14) has an insulating spark gap (15) responding in the case of an error with a defined response voltage (UT) for grounding the live conductors (9, 10).

15 Claims, 1 Drawing Sheet

MOBILE GENERATOR AND MOBILE GENERATOR PROTECTIVE DEVICE

CROSS REFERENCE TO RELATED APPLICATIONS

This application claims the benefit of priority under 35 U.S.C. §119 of German Patent Application DE 10 2011 080 436.6 filed Aug. 4, 2011, the entire contents of which are incorporated herein by reference.

FIELD OF THE INVENTION

The present invention pertains to a mobile generator for generating a direct voltage for a tool supplied with direct current as well as to a corresponding mobile generator protective device.

BACKGROUND OF THE INVENTION

Tools supplied with direct current are defined, for example, as magnetic plates that can be arranged on excavators or also mobile welding means.

Such generators are used mainly on material loading and unloading equipment on scrap yards or on demolition machines for recycling steel between concrete parts, where magnetic objects are moved by means of the magnetic plates mentioned in the introduction on the boom of an excavator or of a crane. Other machines, such as wheel mounts, wheel loaders, forklifts, and traveling cranes are also possible for such use.

Such magnetic systems are used in very harsh environments exposed to weather. Little consideration is also shown in practice for mechanical wear or damage to the generator as well as for the cabling thereof to the magnetic plate and the magnetic plate itself. The generator is usually located well protected in or around the engine area of the construction equipment. The cabling is embodied with commercially available multiwire lines from the generator to the magnetic plate via the arm of the excavator, via a helix cable from the forklift to the magnetic plate or other lines, which are more or less protected from mechanical destruction. The electric terminal of the magnetic plate is usually a 2-pole, 3-pole, or 5-pole junction box. This is usually located in the vicinity of the magnetic plate. The magnetic plate is used under harsh conditions. In blind areas, e.g., in ship or truck containers or in loading bays, the magnetic plate cannot always be placed carefully on the material to be loaded. Hard blows and shocks are common. It is also used at times incorrectly to compact material when loading containers. The cable, junction box or magnetic plate is frequently damaged due to the harsh use.

Electronically controlled generators are usually resistant to short-circuits and load failure. If the line is torn off completely during operation, a very high voltage will build up due to the inductance of the magnetic plate, and this voltage remains ignited via an arc at the torn-off cable until the energy of the magnetic plate drops in the arc below the ignition voltage of the arc.

The electronic control unit of the generator records this, as a rule, by the absence of output current and can respond to the failure by switching off the device. The live output lines of the electronically controlled generator are usually protected against overvoltage at the direct voltage output and on the life output lines, because the lines must reduce the inductive voltage of the magnetic plate during normal operation anyway.

If a short-circuit develops, the output lines are consequently short-circuited, e.g., by a pinched cable, and this is usually recognized in the electronically controlled generator by a current measurement. The electronic unit switches off in this case as well.

A brief explanation of the generator network in construction equipment shall be given below for the better understanding of the problem encountered in the state of the art.

Fuse disconnection is used, as a rule, in generators in construction equipment, i.e., the live wires are insulated against ground/ground wire (PE—protective earth). The use of an earth leakage monitor, which can recognize poor insulation against ground/PE is possible in case of this network only.

An unacceptably high voltage may build up between these potentials due to the separation of live wires and ground/PE. If this happens, a flashover of the voltage may occur on undefined components of the generator. This flashover usually destroys the electronic unit or parts thereof.

An unacceptably high voltage may develop on the generator system in the following exemplary cases, and even an earth leakage monitor integrated in the system may offer only limited protection at best in this case:

The line to the magnetic plate is torn off only partly and the torn-off cable of the magnetic plate comes into connection with the chassis of the magnetic plate, excavator arm or ground.

The junction box to the magnetic plate is mechanically destroyed or has water damage in connection with an interruption of only one line.

The magnetic plate has an internal short to ground in connection with an interruption of only one line.

The magnetic plate has poor insulation against ground/PE in connection with the interruption of only one line.

The above-mentioned protective action of an earth leakage monitor can be explained as follows for completeness' sake on the basis of two errors:

The first error is, e.g., a poor insulation or short to ground/PE.

The second error is an interruption of a line from the electronically controlled generator to the magnetic plate. Should a suitable earth leakage monitor be used in the electronically controlled generator, this offers only a limited protective effect. It would offer protection only if the electronically controlled generator is switched off immediately in the first error (insulation value<23 kOhms) and the electronically controlled generator is blocked by means of a reclosure preventing device. The earth leakage monitor offers no protection if the first error is above the threshold of typically 23 kOhms.

There also is no significant protection if the second error occurs, without switching off the electronically controlled generator, or the second error occurs with a short time difference from the first error.

US 2005/0094345 A1 discloses a protective means in the form of an insulating spark gap between the two feed lines of an induction means in the form of a magnetic coil on an excavator. This protective means is used for protection in case of failure of a feed line based on the harsh ambient conditions occurring in case of such construction equipment.

US 2009/0160590 A1 shows a process and a device for controlling a lifting magnet, which is supplied via an alternating-voltage generator with downstream rectifier bridges.

DE 10 2007 015 933 A1 discloses an overvoltage protection means for use in direct-current networks, in which a bypass with a spark gap is again provided.

Similar spark gaps for protective electric devices can be found in DE 10 2008 025 501 A1 and DE 44 27 032 C1.

DE 28 51 537 A1 shows a protective means, for example, for high-power transmitters with a spark gap and protective resistor, in which the spark gap is scanned by means of an optical sensor and whose response is detected for quickly disconnecting the power supply.

SUMMARY OF THE INVENTION

A basic object of the present invention is to protect the electronically controlled generator and correspondingly the area surrounding same, such as persons and objects, in the errors described in the introduction to an improved degree.

This object is accomplished according to the present invention by a protective means in such mobile generators, which is arranged between the live wires (conductors) and a protective potential, especially ground or PE. This protective means (device) has an insulating spark gap responding in error, associated with a defined response voltage, to ground of the live wire.

The errors described in the introduction to the specification are handled effectively by this grounding and the entire system is transferred into a defined, safe state.

According to the present invention, the problem of overload of the insulating spark gap can be solved in case of a single-time response or multiple responses, above all responses occurring in a short time one after another, by an indicator device for recording the response of the insulating spark gap. A parameter, for example, in the form of a signal fed by the indicator device into the control unit, is thus made available to the system, and, e.g., the generator or the d.c. output thereof is switched on the basis of this signal by a switch-off means coupled with the indicator device. The insulating spark gap remains conductive after the switch-off until the voltage drops below its ignition voltage to reduce the magnetic energy in the system.

According to the present invention, the switch-off means also controls, furthermore, the reclosing of the generator as a function of the frequency of responses and/or the response rate of the insulating spark gap. The insulating spark gap is thus prevented from being overloaded in case of repeated occurrence of a error with response of the insulating spark gap within a short time. The control unit can thus be caused to wait a defined time until the generator with the insulating spark gap is again made ready to use. The time triggering may be embodied by means of the indicator device.

The defined response voltage of the insulating spark gap is preferably designed to be such that the protective device remains intact even in case it responds several times. Fixed values cannot be specified for this, because this depends on the maximum design voltages of the electronic semiconductor components used for electronically controlled generators. Maximum voltages are, for example, approximately 600 V, 1,200 V or 1,600 V. The maximum insulation voltage also has a maximum of about 2,500 V between the semiconductor components and ground/PE, as it is formed by the cooling elements of the semiconductors. In case of failure, the insulating spark gap must then limit the maximally occurring voltage between ground/PE and the semiconductor components in order to prevent a defect because of flashover or overvoltage. The insulating spark gap should, furthermore, preferably be designed such that the protective device remains intact even in case of multiple response. No design details can be set in the corresponding claim here, either, because the design must be selected to be such that the components involved will not be destroyed even in case of the largest commercially available magnetic plates in all operating situations based on the spark gap occurring in case of failure and the thermal load associated therewith. Multiple response in a short time is also to be included in the design criteria to avoid overload of the insulating spark gap.

The present invention also pertains to a protective device for a mobile generator as such with the components of an insulating spark gap already discussed above, the indicator device and the switch-off means. To avoid repetitions, reference can be made to the corresponding explanations given above.

Such a protective device can preferably be installed not only as a safety system in new generators, but it may also be used to retrofit existing generators.

Further features, details and advantages of the present invention appear from the following description of an exemplary embodiment on the basis of the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
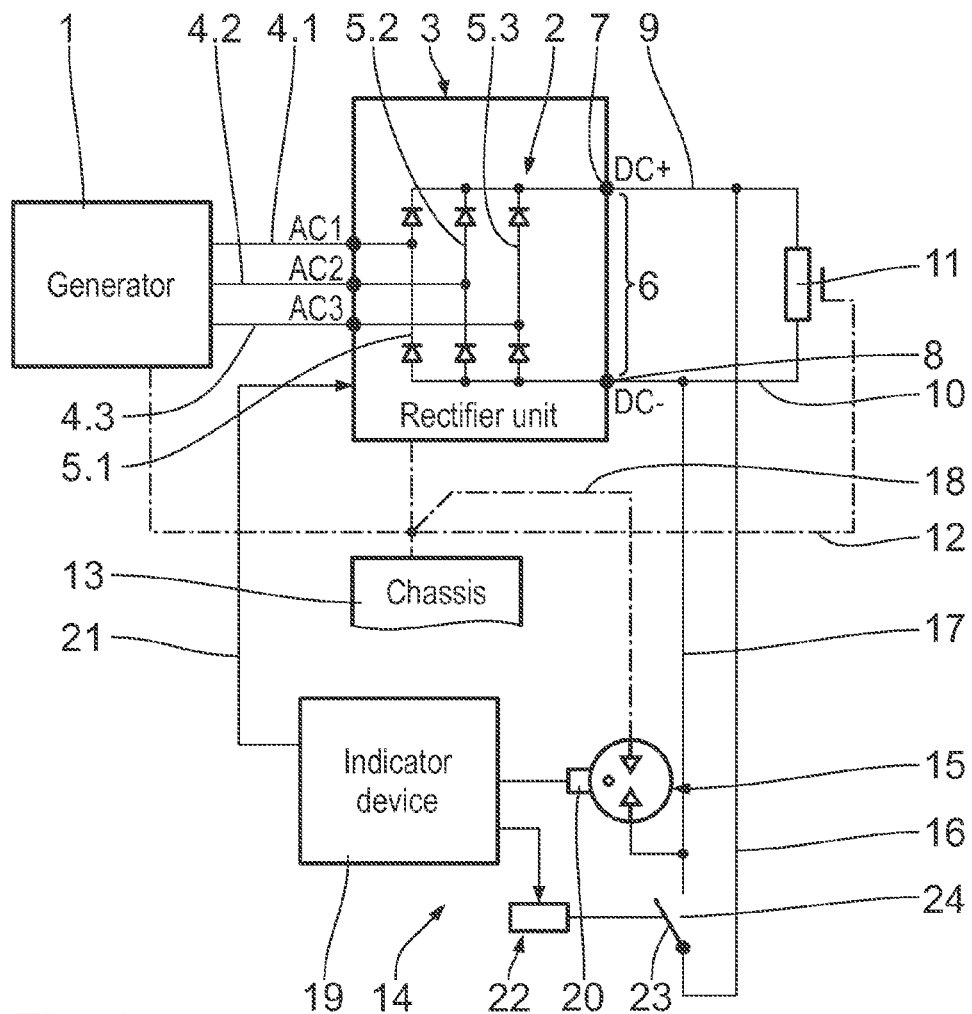
FIG. 1 is a block diagram of a generator according to the invention.

Referring to the drawings in particular, the mobile generator shown in FIG. 1, as it is used, for example, on an excavator, has as the main component an alternating-voltage (a.c.) generator 1 and a rectifier unit 2, which is supplied by the generator and which is coupled with a corresponding control unit 3. The AC generator is driven mechanically by the internal combustion engine of the excavator. The three-phase alternating voltage is fed via three connection lines 4.1, 4.2, 4.3 to the diode regions 5.1, 5.2, 5.3 of the rectifier unit 2 in a phase-separated manner. These diode regions are connected to the direct-voltage output 6 of the rectifier unit 2, which has a positive terminal pole 7 and a negative terminal pole 8. The terminal poles 7, 8 are each connected via live wires 9, 10 to the corresponding tool, such a magnetic plate 11 fastened to an excavator (not shown) as in the case being shown.

A connection to ground or protective wire 12 indicated by dash-dotted line in FIG. 1 is connected to the housings of the alternating voltage generator 1, of the control unit 3 and of the magnetic plate 11 and coupled with the chassis 13 of the construction equipment.

A protective device designated by 14 as a whole assumes the protective functions comprehensively explained in the above description for the different errors, which may occur, for example, due to an uncontrolled rupture of one of the connection wires 9, 10 of the magnetic plate 11. This protective device 14 has as its key component a gas-filled insulating spark gap 15, which is coupled, on the one hand, to the connection wires 9, 10 between the direct-voltage output 6 and the magnetic plate 11 via two connection lines 16, 17 branched in parallel. On the other hand, the insulating spark gap 15 is electrically connected to the protective wire 12 via a ground wire 18. If a voltage higher than the defined response voltage UT occurs on one of the two conductors 9, 10 based on one of the above-described errors, the insulating spark gap 15 is activated (ignites—sparks) and ensures a defined reduction of this hazardous voltage via the ground wire 18. The maximally occurring voltage between the ground wire 18 representing the protective potential and the electronic components of the control unit 3 with the rectifier unit 2 thereof is thus limited to a value tolerable for the component. The design of the response voltage UT of the insulating spark gap 15 should, furthermore, be selected to be such that the insulating spark gap 15 remains intact even in case of multiple response of the insulating spark gap.

To detect and record such a response of the insulating spark gap 15, the insulating spark gap 15 is associated with an indicator device 19. A suitable detector 20 at the insulating spark gap 15 may be based on various physical principles of measurement:

A current transformer measuring the spark gap current may be provided.

An indirect detector array can measure the rate of change of the voltage between the protective potential, i.e., the ground wire 18, and the components of the control unit 3 by means of a voltage detector.

Since heat is extensively generated in case of response of the insulating spark gap 15, the response of the insulating spark gap can be detected on the basis of the change in the temperature of the insulating spark gap 15.

It is common to the above-mentioned three principles of measurement that a threshold value is set for the corresponding parameters in the indicator device, and exceeding of this threshold value is recognized as response of the insulating spark gap 15, after which a corresponding signal is generated. The desired analyses can be performed on this basis and actions can be triggered. Thus, the indicator device 19 may be connected to the control unit 3 via a signal line 21. A log of information on, for example, the frequency of responses, i.e., the number of response events per unit of time or response rate, i.e., the rate of the parameter being monitored, for example, the rate of change of the voltage between the ground wire 18 and the components of the control or rectifier unit 3, 2, can be sent to the control unit 3 via this signal line 21. Corresponding to the parametrization of the control unit, the latter can then ensure that the direct-voltage output is not switched on any longer or it is switched on at least with a certain time delay only.

Finally, a separate switch-off means 22 in the form of a relay 23 with switching contact 24 may also be provided in the connection line 16 between the insulating spark gap 15 and wire 9 of the direct-voltage output 6. The relay 23 is actuated by the indicator device 19, so that the direct-voltage output 6 can be switched off selectively.

The protective device 14, as it is shown in FIG. 1, may be coupled as a retrofitting unit with an existing generator with AC generator 1, rectifier and control unit 2, 3 and direct-voltage output 6.

Figure 2:
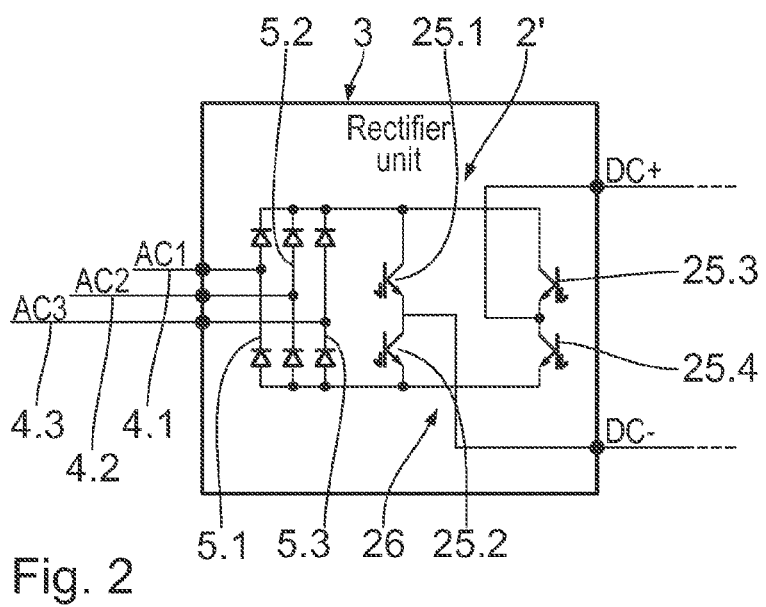
FIG. 2 is a block diagram showing an alternative embodiment of the rectifier unit used in the generator according to FIG. 1.

FIG. 2 shows a control unit 3 with a rectifier unit 2' whose design differs from that of the rectifier unit 2 according to FIG. 1. Rectifier unit 2' is designed as a so-called "H bridge." The diode regions 5.1, 5.2, 5.3 are coupled for this with the direct-voltage output 6 via an H bridge of power transistors 25.1, 25.2, 25.3 and 25.4.

While specific embodiments of the invention have been shown and described in detail to illustrate the application of the principles of the invention, it will be understood that the invention may be embodied otherwise without departing from such principles.

What is claimed is:

1. A mobile generator for generating a direct voltage for a tool supplied with direct current, the mobile generator comprising:
    an alternating voltage generator;
    an electronic control unit;
    a rectifier unit having components including a direct-voltage output with live conductors for connecting the tool;
    a protective potential, said protective potential being one of a ground and a protective wire;
    a protective device between the live conductors and the protective potential, the protective device comprising an insulating spark gap for grounding the live conductors via the protective potential in response to an error having an associated defined response voltage occurring on one of the two conductors;
    an indicator device associated with said insulating spark gap, wherein the indicator device is adapted for recording a response of the insulating spark gap; and
    a switch-off device coupled with the indicator device and in case of an error switching off the generator via one of said control unit and said direct-voltage output, the switch-off device controlling a re-closing of the generator as a function of a frequency of responses and/or a response rate of the insulating spark gap.

2. A mobile generator in accordance with claim 1, wherein the defined response voltage is designed to be such that a maximally occurring voltage between the protective potential and the components of the rectifier unit is limited to a value tolerable for the components of the rectifier unit.

3. A mobile generator in accordance with claim 1, wherein the insulating spark gap is designed such that the protective device remains intact even in case of multiple responses of the insulating spark gap.

4. A mobile generator in accordance with claim 1, wherein the indicator device comprises a detector comprising a current transformer measuring a spark gap current.

5. A mobile generator in accordance with claim 1, wherein the indicator device comprises as a detector comprising a voltage detector measuring a rate of change of a voltage between the protective potential and the component of the rectifier unit or between the protective potential and the electronic control unit.

6. A mobile generator in accordance with claim 1, wherein the indicator device comprises as a detector comprising a temperature sensor for monitoring a temperature of the insulating spark gap.

7. A protective device for a mobile generator for generating a direct voltage for a tool supplied with direct current, the mobile generator comprising an alternating-voltage generator, an electric control unit and a rectifier unit, which has a direct-voltage output with live conductors for connecting the tool, the protective device comprising:
    an insulating spark gap with a defined response voltage responding in a case of error for grounding the live conductors, which the insulating spark gap is inserted between the live conductors and a protective potential;
    an indicator device for recording the response of the insulating spark gap;
    a switch-off device coupled with the indicator device for switching off one of the generator via the electric control unit of the generator and the direct-voltage output in the case of error, the switch-off device being associated with the insulating spark gap, the switch-off device controlling a reclosure of the generator as a function of at least one of a frequency of responses and a response rate of the insulating spark gap.

8. A protective device in accordance with claim 7, wherein the defined response voltage is designed to be such that:
- a maximally occurring voltage between the protective potential and at least one of components of the control and components of the rectifier unit is limited to a value tolerable for the components; and
- the protective device remains intact even in case of multiple responses of the insulating spark gap.

9. A protective device in accordance with claim 7, wherein the protective device can be used to retrofit existing generators.

10. A mobile generator for generating a direct voltage for a tool supplied with direct current, the mobile generator comprising:
- an alternating voltage generator;
- an electronic control unit;
- a rectifier unit comprising a direct-voltage output with live conductors for connecting the tool;
- a protective potential, said protective potential comprising one of a ground and a protective wire;
- a protective device provided between the live conductors and the protective potential, said protective device comprising an insulating spark gap, said insulating spark gap being activated when a voltage associated with at least one of said two conductors is greater than a defined response voltage such that said insulating spark gap grounds the live conductors via the protective potential;
- an indicator device associated with said insulating spark gap, said indicator device recording a response of the insulating spark gap; and
- a switch-off device coupled with the indicator device, said switch-off device being configured to deactivate the generator via one of said control unit and said direct-voltage output when the voltage associated with at least one of said two conductors is greater than the defined response voltage, said switch-off device being configured to control a reactivation of the generator based on one or more of a frequency of responses of said insulating spark gap and a response rate of said insulating spark gap.

11. A mobile generator in accordance with claim 10, wherein the defined response voltage is designed to be such that a maximally occurring voltage between the protective potential and components of the rectifier unit is limited to a value tolerable for the components of the rectifier unit.

12. A mobile generator in accordance with claim 10, wherein the insulating spark gap is designed such that the protective device remains intact even in case of multiple responses of the insulating spark gap.

13. A mobile generator in accordance with claim 10, wherein the indicator device comprises a detector comprising a current transformer measuring a spark gap current.

14. A mobile generator in accordance with claim 10, wherein the indicator device comprises as a detector comprising a voltage detector measuring a rate of change of a voltage between the protective potential and the component of the rectifier unit or between the protective potential and the electronic control unit.

15. A mobile generator in accordance with claim 10, wherein the indicator device comprises a detector comprising a temperature sensor for monitoring a temperature of the insulating spark gap.

* * * * *